(12) United States Patent
Okamura et al.

(10) Patent No.: US 9,564,253 B2
(45) Date of Patent: Feb. 7, 2017

(54) SCINTILLATOR PANEL

(71) Applicant: Toray Industries, Inc., Chuo-ku, Tokyo (JP)

(72) Inventors: Masaki Okamura, Otsu (JP); Hiroshi Enomoto, Tokyo (JP); Yuichiro Iguchi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 72 days.

(21) Appl. No.: 14/442,936

(22) PCT Filed: Nov. 7, 2013

(86) PCT No.: PCT/JP2013/080096
§ 371 (c)(1),
(2) Date: May 14, 2015

(87) PCT Pub. No.: WO2014/077178
PCT Pub. Date: May 22, 2014

(65) Prior Publication Data
US 2015/0310953 A1   Oct. 29, 2015

(30) Foreign Application Priority Data
Nov. 16, 2012   (JP) .................................. 2012-251893

(51) Int. Cl.
*G21K 4/00*   (2006.01)
*G01T 1/20*   (2006.01)

(52) U.S. Cl.
CPC ............... *G21K 4/00* (2013.01); *G01T 1/2002* (2013.01); *G21K 2004/06* (2013.01)

(58) Field of Classification Search
CPC .......... G01T 1/2002; G01T 1/202; G01T 1/20; G21K 4/00; G21K 2004/06
See application file for complete search history.

(56) References Cited

U.S. PATENT DOCUMENTS

| | | | |
|---|---|---|---|
| 5,091,650 A | 2/1992 | Uchida | |
| 2003/0150994 A1* | 8/2003 | Freund | .................... G01T 1/202 250/368 |

(Continued)

FOREIGN PATENT DOCUMENTS

| | | |
|---|---|---|
| CN | 101779145 | 7/2010 |
| JP | 05060871 | 3/1993 |

(Continued)

OTHER PUBLICATIONS

Extended European Search Report for EP Application No. 13855349.0, dated May 31, 2016.

(Continued)

*Primary Examiner* — Marcus Taningco
(74) *Attorney, Agent, or Firm* — Ratnerprestia (57) ABSTRACT

The present invention provides a scintillator panel which is provided with a narrow-width barrier rib with high accuracy in a large area, and also has high luminous efficiency and realizes clear image quality. The present invention provides a scintillator panel including a sheet-like substrate, a barrier rib provided on the substrate, and a scintillator layer made of a phosphor filled in cells divided by the barrier rib, wherein a reflecting layer is formed on only one side of the barrier rib.

10 Claims, 3 Drawing Sheets

(56) References Cited

U.S. PATENT DOCUMENTS

| | | |
|---|---|---|
| 2005/0087692 A1 | 4/2005 | Romanov |
| 2008/0023637 A1* | 1/2008 | Heismann ............ G01T 1/2002 |
| | | 250/366 |
| 2010/0148074 A1 | 6/2010 | Menge |
| 2011/0017916 A1 | 1/2011 | Schulz |
| 2014/0091235 A1 | 4/2014 | Iguchi |
| 2015/0241569 A1 | 8/2015 | Okamura |
| 2015/0316659 A1 | 11/2015 | Okamura |

FOREIGN PATENT DOCUMENTS

| | | |
|---|---|---|
| JP | 05188148 | 7/1993 |
| JP | 2001330677 | 11/2001 |
| JP | 3333278 | 10/2002 |
| JP | 2007510144 | 4/2007 |
| JP | 2011007552 | 1/2011 |
| JP | 2011021924 | 2/2011 |

OTHER PUBLICATIONS

International Search Report for International Application No. PCT/JP2013/080096 mailed Jan. 14, 2014.

* cited by examiner

SCINTILLATOR PANEL

CROSS REFERENCE TO RELATED APPLICATIONS

This is the U.S. National Phase application of PCT/JP2013/080096, filed Nov. 7, 2013, which claims priority to Japanese Patent Application No. 2012-251893, filed Nov. 16, 2012, the disclosures of these applications being incorporated herein by reference in their entireties for all purposes.

FIELD OF THE INVENTION

The present invention relates to a scintillator panel which is used for a medical diagnostic apparatus, a nondestructive inspection instrument, and the like.

BACKGROUND OF THE INVENTION

Heretofore, X-ray images using films have widely been used in medical settings. However, the X-ray image using a film provides analog image information, and thus digital radiation detection devices such as computed radiography (CR) and flat panel radiation detection devices (flat panel detectors: FPDs) have recently been developed.

In a flat panel X-ray detector (FPD), a scintillator panel is used for converting radiation into visible light. The scintillator panel contains an X-ray phosphor such as cesium iodide (CsI) and the X-ray phosphor emits visible light in response to applied X-ray, and the emitted light is converted into an electric signal by a thin film transistor (TFT) or a charge-coupled device (CCD) to thereby convert X-ray information into digital image information. However, the FPD has a problem such as a low S/N ratio. In order to increase the S/N ratio, there have been proposed methods of irradiating with X-ray from a light detector side (Patent Literatures 1 and 2), and also there have been proposed methods of filling cells divided by a barrier rib with an X-ray phosphor, so as to reduce an influence of the scattering of visible light due to the X-ray phosphor (Patent Literatures 3 to 6).

The method which has hitherto been used as a method for forming the barrier rib is a method of etching a silicon wafer, or a method in which a glass paste as a mixture of a pigment or a ceramic powder and a low melting point glass powder is pattern-printed in multiple layers using a screen printing method, and then fired to form a barrier rib. However, in the method of etching a silicon wafer, the size of a formable scintillator panel is limited by the size of the silicon wafer, and a scintillator panel having a large size of 500 mm square could not be obtained. A plurality of small-size panels should be arranged for making a large-size panel. However, it is difficult to produce the scintillator panel in view of accuracy, and a large-area scintillator panel was scarcely produced.

In the multi-layer screen printing method using a glass paste, it is difficult to process with high accuracy due to a dimensional variation of a screen printing sheet, or the like. When multi-layer screen printing is performed, a definite barrier rib width is required for increasing the strength of a barrier rib in order to prevent destructive defects of the barrier rib. However, if the width of the barrier rib increases, a space between barrier ribs becomes relatively small, so that a volume available for filling an X-ray phosphor decreases, and the filling amount is not uniform. Therefore, a scintillator panel obtained in this method has a disadvantage such as a decrease in luminescence or occurrence of luminous unevenness because of too small amount of an X-ray phosphor. This disadvantage of flexibility is an obstacle to formation of clear images in photographing at a low dose.

PATENT LITERATURE

[Patent Literature 1]
Japanese Patent No. 3333278
[Patent Literature 2]
Japanese Patent Laid-Open Publication No. 2001-330677
[Patent Literature 3]
Japanese Patent Laid-Open Publication No. 5-60871
[Patent Literature 4]
Japanese Patent Laid-Open Publication No. 5-188148
[Patent Literature 5]
Japanese Patent Laid-Open Publication No. 2011-007552
[Patent Literature 6]
Japanese Patent Laid-Open Publication No. 2011-021924

SUMMARY OF THE INVENTION

Production of a scintillator panel having high luminous efficiency and is capable of realizing clear images requires technology for processing a barrier rib, capable of processing with high accuracy in a large area and reducing the width of the barrier rib, and technology for preventing visible light emitted by an X-ray phosphor from leaking outside the barrier rib.

An object of the present invention is to solve the problems mentioned above and to provide a scintillator panel which is provided with a narrow-width barrier rib with high accuracy in a large area, and also has high luminous efficiency and realizes clear image quality.

The above-mentioned object is achieved by any of the following technical means:

(1) A scintillator panel including a sheet-like substrate, a barrier rib provided on the substrate, and a scintillator layer made of a phosphor filled in cells divided by the barrier rib, wherein a reflecting layer is formed on only one side of the barrier rib;

(2) The scintillator panel according to the above (1), wherein a transmittance of light having a wavelength of 550 nm at a thickness of 30 μm of the barrier rib is 10 to 100%;

(3) The scintillator panel according to the above (1) or (2), wherein a reflectance of light having a wavelength of 550 nm of the reflecting layer is 60% or more;

(4) The scintillator panel according to any one of the above (1) to (3), wherein the barrier rib is a grid-like barrier rib;

(5) The scintillator panel according to the above (4), wherein the cells are distinguished into a cell A with a reflecting layer formed on the entire inside surface and a cell B with a reflecting layer not formed on the entire inside surface;

(6) The scintillator panel according to the above (5), wherein a pitch of the cell A is wider than a pitch of the cell B;

(7) The scintillator panel according to any one of above (1) to (3), wherein the barrier rib is a stripe-like barrier rib;

(8) The scintillator panel according to the above (7), wherein the cells are distinguished into a cell C with a reflecting layer formed on the entire inside surface and a cell D with a reflecting layer not formed on the entire inside surface;

(9) The scintillator panel according to the above (8), wherein a pitch or the cell C is wider than a pitch of the cell D; and (10) The scintillator panel according to any one of above (1) to (9), wherein the barrier rib is composed of a material containing, as a main component, a low melting point glass containing 2 to 20% by mass of an alkali metal oxide.

According to the present invention, since a barrier rib having a high strength can be formed with high accuracy in a large area, and also visible light emitted by a phosphor can be efficiently utilized, it became possible to provide a scintillator panel and a radiation detection device for realizing formation of clear images in photographing.

DETAILED DESCRIPTION OF EMBODIMENTS OF THE INVENTION

Preferred configurations of a scintillator panel and a radiation detection device using the same of the present invention will be described with reference to FIG. 1 and FIG. 3, but the present invention is not limited thereto.

Figure 1:
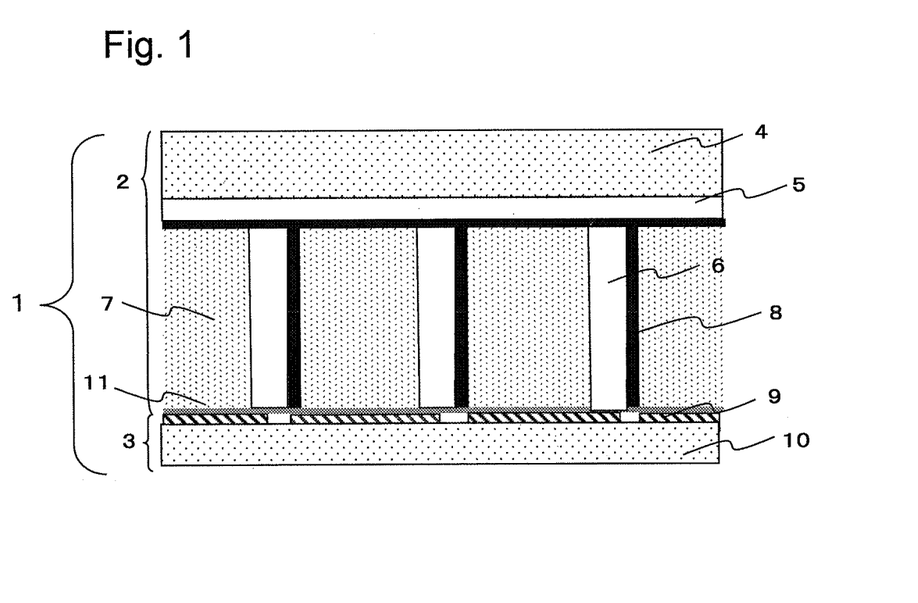
FIG. 1 is a sectional view schematically showing the configuration of a radiation detection device including a scintillator panel according to an embodiment of the present invention.
Figure 2:
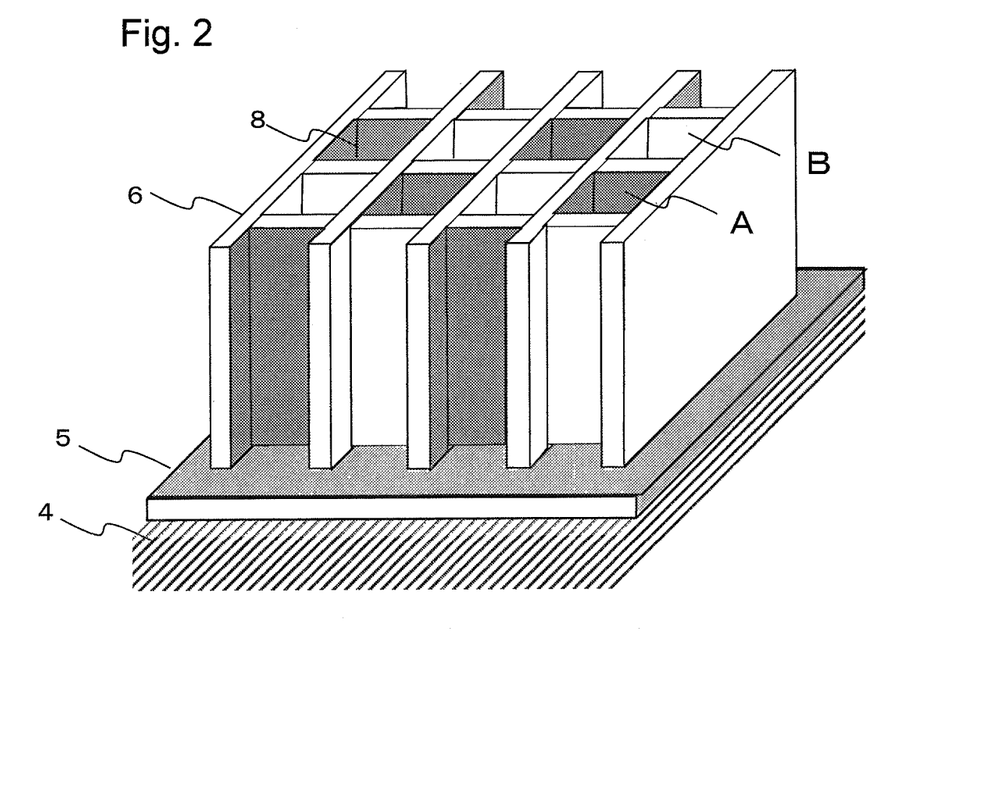
FIG. 2 is a perspective view schematically showing the configuration of the scintillator panel according to an embodiment of the present invention.
Figure 3:
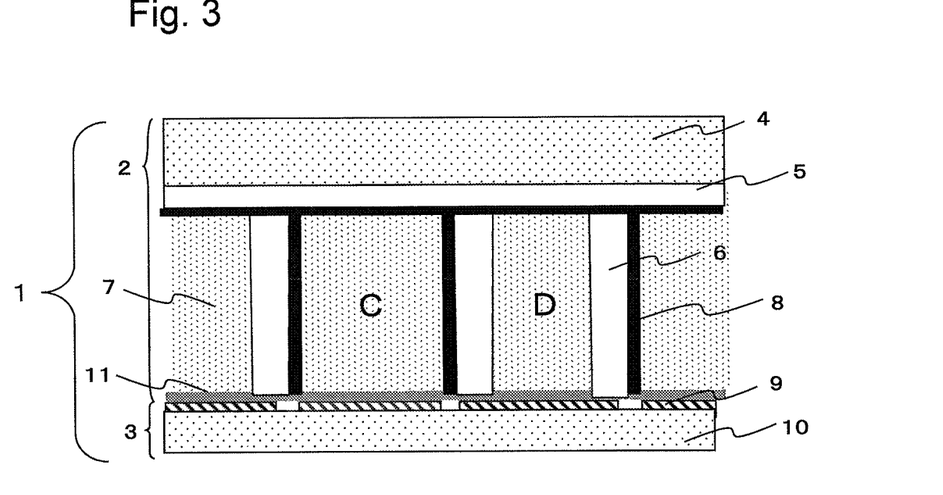
FIG. 3 is a sectional view schematically showing the configuration of a radiation detection device including a scintillator panel according to an embodiment of the present invention.

FIG. 1 and FIG. 3 are sectional views schematically showing the configuration of a radiation detection device including a scintillator panel according to an embodiment of the present invention. FIG. 2 is a perspective view schematically showing an example of the configuration of the scintillator panel according to an embodiment of the present invention. The radiation detection device 1 includes a scintillator panel 2 and a light detector 3. The scintillator panel 2 includes a scintillator layer 7 made of a phosphor, and absorbs energy of an incident radiation such as X-ray to emit electromagnetic wave having a wavelength ranging from 300 to 800 nm, i.e. electromagnetic wave (light) which ranges from ultraviolet light to infrared light with visible light at the center.

The scintillator panel 2 is composed of a sheet-like scintillator panel side substrate 4, a rib 6 formed thereon, and a scintillator layer 7 made of a phosphor filled in a space divided by the barrier rib. A space divided by the barrier rib 6 is sometimes called a cell. Radiation may be incident from either a scintillator panel side or a light detector side. A radiation shielding layer 5 is preferably formed between a substrate and a barrier rib 6 on the side where radiation is not incident. For example, since the scintillator panel 2 shown in FIG. 1 is an aspect in which radiation is incident from the light detector 3, a radiation shielding layer 5 is formed between a substrate, namely, a scintillator panel side substrate 4 and a barrier rib 6 on the side where radiation is not incident. Radiation passed through the scintillator layer 7 is absorbed by the radiation shielding layer 5, thus enabling shielding of radiation so as not to leak outside the radiation detection device. The radiation shielding layer 5 preferably has a high reflectance of visible light.

As shown in FIG. 1, in an embodiment of the present invention, a reflecting layer 8 is formed on only one side of the barrier rib 6. Light emitted from the phosphor in the cell reflects by the reflecting layer 8 and is not transmitted through the adjacent cells, thus enabling high-accuracy photographing. Meanwhile, since the barrier rib itself transmits light, light reaches the side where a reflecting layer of the barrier rib is not formed is transmitted through the barrier rib. However, light is reflected by the reflecting layer formed on the opposite side and is not transmitted through the adjacent cells. Light transmitted the barrier rib can reach the light detector 3 without passing through the scintillator layer 7. Light transmitted through the barrier rib efficiently reaches the light detector 3 since the light is not scattered by the phosphor as compared with light which is transmitted through the scintillator layer 7. Particularly, it is possible to make use of light emitted from the phosphor located separately from the light detector 3 with high efficiency. Therefore, a luminance is improved in the obtained radiation detection device.

When a reflecting layer 8 is formed on both sides of the barrier rib 6, light emitted from the phosphor in the cell is not transmitted to adjacent cells, thus exerting the effect capable of performing high-accuracy photographing. However, as compared with the case where the reflecting layer 8 is formed on only one side of the barrier rib 6, it is impossible to obtain the above-mentioned effect of improving luminance by passing light through the barrier rib. Meanwhile, when any reflecting layer was not formed, light emitted from the phosphor in the cell is transmitted to the adjacent cells, leading to deterioration of accuracy of photographing.

It is not really necessary that a reflecting layer is formed on only one side in all barrier ribs. In order to sufficiently exert the effect of the present invention only to one side, the reflecting layer is preferably formed on only one side in 50% or more barrier ribs in all barrier ribs, and the reflecting layer is more preferably formed on only one side in all barrier ribs.

It is preferred that a reflecting layer 8 is also formed on a scintillator panel side substrate 4 or radiation shielding layer 5 on the side where radiation is not incident, in addition to the reflecting layer formed on the side on which the barrier rib was formed. These reflecting layers can efficiently guide light emitted by a phosphor 7 to the light detector 3 side.

The light detector 3 is composed of a light detector side substrate 10, and a photoelectric conversion layer 9 formed thereon. It is possible to use, as the substrate 10, insulating substrate such as a glass substrate, a ceramic substrate, or a resin substrate. The photoelectric conversion layer 9 is that obtained by forming a light detection pixel composed of a photomultiplier tube, a photosensor such as a photodiode or a PIN photodiode, and a thin film transistor (TFT) in a matrix-like shape. The radiation detection device 1 is formed by laminating a scintillator panel 2 with a photoelectric conversion layer 9 of a light detector 3 so as to face each other. An adhesive layer 11 made of a polyimide resin is preferably formed between a barrier rib 6 and a scintillator layer 7 of a scintillator panel 2, and the light detector 3. When light is incident from the light detector 3 side, radiation is passed through the photoelectric conversion layer 9, and then converted into visible light in the scintillator layer 7, and the visible light is detected by the photoelectric conversion layer 9, photo electrically converted, and then outputted.

In order to enhance sharpness of the radiation detection device 1, the barrier rib 6 of a scintillator panel 2 is preferably located at the part between adjacent pixels in the photoelectric conversion layer 9. Each cell of the scintillator panel 2 is divided by the barrier rib. When the size and pitch of pixels formed in a matrix-like shape are made coincident with the size and pitch of cells of the scintillator panel 2, each pixel of a photoelectric conversion element is made correspondent with each cell of the scintillator panel. If light emitted in a scintillator layer 7 is scattered by the phosphor, scattered light is reflected by the barrier rib. Therefore, scattered light can be prevented from reaching the adjacent cell. As a result, blurring of images due to light scattering can be reduced, thus enabling high-accuracy photographing. The pitch of cells refers to a barrier rib side constituting cells, namely, a distance between inside surfaces of cells. More specifically, as shown in FIG. 1 and FIG. 3, a reflecting layer provided on one side of the barrier rib is preferably located at the part between pixels of the photoelectric conversion layer 9.

The barrier rib preferably has a high light transmittance since emitted light passed through the barrier rib is guided to a light detector 3. The transmittance of light having a wavelength of 550 nm at a thickness of 30 μm is more preferably 10 to 100%, and most preferably 50 to 100%. The transmittance of the barrier rib is measured by forming a solid film having a thickness of 30 μm on a glass substrate using a barrier rib material. The barrier rib solid film is formed in the same manner as in the below-mentioned method for producing a barrier rib, except that no pattern is formed so that a barrier rib solid film made of a barrier rib material is formed on the entire surface of a glass substrate in a thickness of 30 μm. Regarding the obtained barrier rib solid film, a transmittance of light having a wavelength of 550 nm is measured using a spectrophotometer, thus enabling determination of a light transmittance at a thickness of 30 μm.

In order to ensure processability and uniformity of cells, the barrier rib preferably has a grid-like or stripe-like shape.

When the barrier rib has a grid-like shape, in order to ensure uniformity of the entire scintillator panel, a reflecting layer is preferably formed on two inside surfaces of inside surfaces of four barrier ribs constituting each cell. Meanwhile, in order to enhance productivity of the scintillator panel, it is preferred to alternately form a cell A with a reflecting layer formed on the entire inside surface and a cell B with a reflecting layer not formed on the entire inside surface. In this case, as shown in FIG. 2, it is more preferred to arrange a cell A and a cell B so that cells A or cells B are not adjacent with each other. In order to ensure in-plane uniformity of luminance, it is more preferred that a pitch of the cell A is wider than a pitch of the cell B, and a capacity of the cell A is wider than a capacity of the cell B. As mentioned above, since light emitted in the scintillator layer 7 efficiently reach a light detector as compared with the case where the barrier rib is provided with no reflecting layer, the cell B exhibits high luminance when the capacity of the cell A is the same as that of the cell B. At this time, the pitch of the cell A is preferably 1.01 to 1.5 times, and more preferably 1.03 to 1.3 times, more than that that of the cell B.

When the barrier rib has a stripe-like shape, in order to ensure uniformity of the entire scintillator panel, as shown in FIG. 1, a reflecting layer is preferably formed only on the same one side of the barrier rib. Meanwhile, in order to enhance productivity, as shown in FIG. 3, it is preferred that a cell C with a reflecting layer formed on both inside surfaces and a cell D with a reflecting layer not formed on both inside surfaces of two barrier ribs constituting cells are alternately formed. Similarly to the case where the barrier rib has a grid-like shape, in order to ensure in-plane uniformity of luminance, I is more preferred that a pitch of a cell C is wider than a pitch of a cell D, and a capacity of a cell C is larger than a capacity of a cell D. At this time, the pitch of the cell C is preferably 1.01 to 1.5 times, and more preferably 1.05 to 1.3 times, more than that that of the cell D.

When radiation is incident from a scintillator panel side, the material of a scintillator panel side substrate 4 is preferably a material having high transmission properties of radiation, and various glasses, polymer materials, metals, and the like can be used. For example, it is possible to use glass sheets made of glasses such as quartz, borosilicate glass, and chemically reinforced glass; ceramic substrates made of ceramics such as sapphire, silicon nitride, and silicon carbide; semiconductor substrates made of semiconductors such as silicon, germanium, gallium arsenide, gallium phosphide, and gallium nitrogen; polymer films (plastic films) such as a cellulose acetate film, a polyester film, a polyethylene terephthalate film, a polyamide film, a polyimide film, a triacetate film, a polycarbonate film, and a carbon fiber reinforced resin sheet; metal sheets such as an aluminum sheet, an iron sheet, and a copper sheet; and metal sheets having a coating layer of a metal oxide, and amorphous carbon substrates. Of these, a plastic film and a glass sheet are preferable in view of flatness and heat resistance. Since weight reduction of the scintillator panel is promoted for pursuing convenience of transportation of the scintillator panel, the glass sheet is preferably a thin glass.

Meanwhile, radiation is incident from a light detector side, a material of a scintillator panel substrate 4 may be a material having transmission properties of radiation. However, a substrate made of a radiation shielding material, namely, a radiation shielding substrate is preferably used for the purpose of shielding radiation so as not to leak outside a radiation detection device. Examples of the radiation shielding substrate include metal sheets such as an iron sheet and a lead sheet; or glass sheets or films containing heavy metals such as iron, lead, gold, silver, copper, platinum, tungsten, bismuth, tantalum, and molybdenum. When a radiation shielding layer 5 is formed between a substrate and a barrier rib 6 on the side where no radiation is incident, it became less necessary that the scintillator panel substrate 4 is a radiation shielding substrate.

Examples of the material of radiation shielding layer 5 include glass sheets or films containing heavy metals such as iron, lead, gold, silver, copper, platinum, tungsten, bismuth, tantalum, or molybdenum, which are capable of absorbing radiation.

The radiation shielding layer 5 can be formed, for example, by applying a paste for radiation shielding layer, prepared by dispersing an organic component and an inorganic powder including the above-mentioned materials in a solvent to a substrate, followed by drying to form a coating film, and firing the coating film at a temperature of preferably 500 to 700° C., and more preferably 500 to 650° C.

It is preferred that the radiation shielding layer and the barrier rib are simultaneously fired since the number of steps is reduced. In order to prevent dissolution and peeling from occurring when a paste for barrier rib is applied, it is also preferred to perform thermal curing after forming a coating film using, as an organic component of a paste for radiation shielding layer, a thermosetting organic component containing a polymerizable monomer, a polymerizable oligomer, or a polymerizable polymer, and a thermal polymerization initiator.

A barrier rib is preferably composed of a material containing, as a main component, a low melting point glass containing 2 to 20% by mass of an alkali metal oxide in view of durability, heat resistance, and high-definition processing. The material containing, as a main component, a low melting point glass containing 2 to 20% by mass of an alkali metal oxide has appropriate refractive index and softening temperature, and is suitable for forming a narrow barrier rib with high accuracy in a large area. The low melting point glass refers to a glass having a softening temperature of 700° C. or lower. The phrase "containing, as a main component, a low melting point glass containing 2 to 20% by mass of an alkali metal oxide" means that a low melting point glass containing 2 to 20% by mass of an alkali metal oxide accounts for 50 to 100% by mass of a material constituting the barrier rib.

A method for manufacturing a scintillator panel of the present invention preferably includes: a step of forming a photosensitive paste coating film by applying a photosensitive paste containing a low melting point glass and a photosensitive organic component onto a substrate; an exposure step of exposing the obtained photosensitive paste coating film to light; a development step of dissolving and removing apart of the exposed photosensitive paste coating film which is soluble in a developer; a firing step of heating the photosensitive paste coating film pattern after development to a firing temperature of 500 to 700° C. to thereby remove the organic component, and soften and sinter the low melting point glass, thus forming a barrier rib; a step of forming a reflecting layer made of metal on the barrier rib; and a step of filling cells divided by the barrier rib with a phosphor.

In the exposure step, a necessary part of the photosensitive paste coating film is photocured, or an unnecessary part of the photosensitive paste coating film is photodecomposed by exposure to add contrast of dissolution of the photosensitive paste coating film in a developer. In the development step, a part of the exposed photosensitive paste coating film which is soluble in a developer is removed with a developer to obtain a photosensitive paste coating film pattern in which only a necessary part of the coating film remains.

In the firing step, the obtained photosensitive paste coating film pattern is fired at a temperature of 500 to 700° C., preferably 500 to 650° C., whereby the organic component is decomposed and removed, and the low melting point glass is softened and sintered to form a barrier rib containing a low melting point glass. In order to completely remove the organic component, the firing temperature is preferably 500° C. or higher. If the firing temperature is higher than 700° C., deformation of the substrate increases when a general glass substrate is used as the substrate, and therefore the firing temperature is preferably 700° C. or lower.

The method of the present invention is capable of forming a barrier rib with high accuracy as compared to a method in which a glass paste is printed by laminating by a multi-layer screen printing and then fired.

The photosensitive paste is preferably composed of an organic component having photosensitivity, and an inorganic powder containing a low melting point glass which contains 2 to 20% by mass of an alkali metal oxide. The organic component is required in a given amount so as to form a photosensitive paste coating film pattern before firing. If the amount of the organic component is excessively large, the amount of substances to be removed in the firing step increases, so that the shrinkage rate after firing becomes large, and thus pattern defects are likely to occur in the firing step. Meanwhile, an excessively small amount of the organic component may not be preferable since miscibility and dispersibility of an inorganic powder in the paste deteriorate, so that not only defects are likely to occur during firing, but also coatability of the paste deteriorates due to an increase in viscosity of the paste, and also an adverse influence is exerted on stability of the paste. Therefore, the content of the inorganic powder in the photosensitive paste is preferably 30 to 80% by mass, and more preferably 40 to 70% by mass. The content of the low melting point glass is preferably 50 to 100% by mass based on the total of the inorganic powder. The content of the low melting point glass of less than 50% by mass based on the inorganic powder is not preferable since sintering does not satisfactorily proceed in the firing step, leading to a decrease in strength of the barrier rib thus obtained.

In order to ensure that the organic component is removed almost completely and the barrier rib obtained has a given strength in the firing step, it is preferable to use, as the low melting point glass, a low melting point glass containing a low melting point glass having a softening temperature of 480° C. or higher. If the softening temperature is lower than 480° C., the low melting point glass is softened before the organic component is sufficiently removed during firing, thus incorporating the residue of the organic component into the glass. In this case, the organic component may be gradually released later to cause deterioration of product quality. The residue of the organic component incorporated into the glass may cause coloration of the glass. When a glass powder made of a low melting point glass powder having a softening temperature of 480° C. or higher is used and firing is performed at 500° C. or higher, the organic component can be completely removed. As mentioned above, the firing temperature in the firing step is advantageously set to 500 to 700° C. according to an embodiment of the invention, and preferably 500 to 650° C., and thus the softening temperature of the low melting point glass is preferably 480 to 680° C., and more preferably 480 to 620° C.

The softening temperature is determined by extrapolating a heat absorption completion temperature at an endothermic peak by a tangent method from a DTA curve obtained by measuring a sample using a differential thermal analyzer (DTA, "Differential Type Differential Thermal Balance TG8120" manufactured by Rigaku Corporation). Specifically, an inorganic powder as a measurement sample is measured by elevating the temperature at 20° C./minute from room temperature with an alumina powder as a standard sample using a differential thermal analyzer to obtain a DTA curve. A softening point Ts determined by extrapolating a heat absorption completion temperature at an endothermic peak by a tangent method from the obtained DTA curve is defined as a softening temperature.

In order to obtain a low melting point glass, it is possible to use a metal oxide selected from the group consisting of lead oxide, bismuth oxide, zinc oxide, and alkali metal oxide, which are materials effective for lowering the melting point of glass. Of these, an alkali metal oxide is preferably used to thereby adjust the softening temperature of glass. Generally, the alkali metal refers to lithium, sodium, potassium, rubidium and cesium, while the alkali metal oxide for use in the present invention refers to a metal oxide selected from the group consisting of lithium oxide, sodium oxide, and potassium oxide.

In the present invention, the content X of an alkali metal oxide ($M_2O$) in the low melting point glass is preferably within a range of 2 to 20% by mass. If the content of the alkali metal oxide is less than 2% by mass, the softening temperature becomes high, thus requiring to perform the firing step at a high temperature. Therefore, when a glass substrate is used as the substrate, the scintillator panel thus obtained is distorted or defects occur in the barrier rib due to deformation of the substrate in the firing step. If the content of the alkali metal oxide is more than 20% by mass, the viscosity of glass decreases too much in the firing step. Therefore, the shape of the barrier rib obtained is likely to be distorted. Further, the porosity of the barrier rib thus obtained becomes excessively small, leading to a decrease in light emission luminance of the scintillator panel thus obtained.

Further, it is preferred to add 3 to 10% by mass of zinc oxide, in addition to the alkali metal oxide, so as to adjust the viscosity of glass at a high temperature. If the content of zinc oxide is less than 3% by mass, the viscosity of glass at a high temperature tends to become high. The content of zinc oxide is more than 10% by mass, the cost of glass tends to increase.

Further, inclusion of silicon oxide, boron oxide, aluminum oxide, or an oxide of an alkali earth metal in the low melting point glass, in addition to the alkali metal oxide and zinc oxide, enables control of stability, crystallinity, transparency, refractive index, or thermal expansion characteristic of the low melting point glass. The composition of the low melting point glass is preferably adjusted within a range of the composition range mentioned below since it is possible to prepare a low melting point glass having a viscosity characteristic suitable for the present invention.

Alkali metal oxide: 2 to 20% by mass
Zinc oxide: 3 to 10% by mass
Silicon oxide: 20 to 40% by mass
Boron oxide: 25 to 40% by mass
Aluminum oxide: 10 to 30% by mass
Alkali earth metal oxide: 5 to 15% by mass The alkali earth metal refers to one or more metals selected from the group consisting of magnesium, calcium, barium, and strontium.

The particle diameter of inorganic particles containing a low melting point glass can be evaluated using a particle size distribution analyzer ("MT 3300" manufactured by NIK-KISO CO., LTD.). As a measurement method, an inorganic powder is charged in a sample chamber filled with water, and subjected to an ultrasonic treatment for 300 seconds, followed by the measurement.

The 50% volume average particle diameter (D50) of the low melting point glass is preferably 1.0 to 4.0 µm. If D50 is less than 1.0 µm, particles strongly agglomerate and it becomes difficult to achieve uniform dispersibility, leading to deterioration of flow stability of a paste. In this case, when a paste is applied, uniformity of thickness of the coating film deteriorates. If D50 is more than 4.0 µm, surface unevenness of a sintered body thus obtained increases, thus causing breakage of a pattern in the subsequent step.

The photosensitive paste may contain, as the filler, a high melting point glass which is not softened even at 700° C., and ceramic particles such as particles of silicon oxide, aluminum oxide, titanium oxide, or zirconium oxide, in addition to the above-mentioned low melting point glasses. The filler, when used together with the low melting point glass, has the effect of controlling the shrinkage rate after firing of a paste composition and retaining the shape of the barrier rib to be formed. However, if the ratio of the filler to the total inorganic powder is more than 50% by mass, sintering of the low melting point glass is hindered to cause a problem such as a reduction in strength of the barrier rib, unfavorably. The filler preferably has an average particle diameter of 0.5 to 4.0 µm for the same reason as that of the low melting point glass.

In the photosensitive paste, the refractive index n1 of the low melting point glass and the refractive index n2 of the organic component preferably satisfy a relation: $-0.1<n1-n2<0.1$, more preferably $-0.01 \leq n1-n2 \leq 0.01$, and more preferably $-0.005 \leq n1-n2 \leq 0.005$. By satisfying these conditions, light scattering at the interface between the low melting point glass and the photosensitive organic component is suppressed in the exposure step, thus enabling formation of a pattern with high accuracy. Adjustment of the blending ratio of oxides constituting the low melting point glass makes it possible to obtain a low melting point glass having both preferable thermal characteristics and preferable refractive index.

The refractive, index of the low melting point glass can be measured by a Becke line detection method. A refractive index at 25° C. and at a wavelength of 436 nm (g-line) was defined as the refractive index of the low melting point glass in the present invention. The average refractive index of the organic component can be determined by measuring a coating film composed of an organic component by ellipsometry. A refractive index at 25° C. and a wavelength of 436 nm (g-line) was defined as the refractive index of the organic component.

When the photosensitive paste contains a photosensitive organic component as an organic component, pattern processing can be performed by the above-mentioned photosensitive paste method. Use of a photosensitive monomer, a photosensitive oligomer, a photosensitive polymer, or a photo-polymerization initiator as the photosensitive organic component enables control of reactivity. Here, the photosensitivity in the photosensitive monomer, the photosensitive oligomer, and the photosensitive polymer means that when the paste is irradiated with active ray, the photosensitive monomer, the photosensitive oligomer, or the photosensitive polymer undergoes a reaction of photo-crosslinking, photo-polymerization, or the like to change the chemical structure.

The photosensitive monomer is a compound having an active carbon-carbon double bond, and examples thereof include nonfunctional compounds and polyfunctional compounds having a vinyl group, an acryloyl group, a methacryloyl group, or an acrylamide group as a functional group. Particularly, it is preferable that the organic component contains 10 to 80% by mass of a compound selected from the group consisting of polyfunctional acrylate compounds and polyfunctional methacrylate compounds from the viewpoint of increasing the crosslinking density during curing by a photoreaction to improve pattern formability. Since various compounds have been developed as the polyfunctional acrylate compounds and polyfunctional methacrylate compounds, it is possible to appropriately select from among those compounds, taking reactivity, refractive index, and the like into consideration.

It is possible to preferably use, as the photosensitive oligomer or the photosensitive polymer, an oligomer or polymer having an active carbon-carbon unsaturated double bond. The photosensitive oligomer or the photosensitive polymer is obtained, for example, by copolymerizing a carboxyl group-containing monomer such as acrylic acid, methacrylic acid, itaconic acid, crotonic acid, maleic acid, fumaric acid, vinylacetic acid, or an acid anhydride thereof, with a monomer such as a methacrylic acid ester, an acrylic acid ester, styrene, acrylonitrile, vinyl acetate, or 2-hydroxyacrylate. It is possible to use, as a method for introducing an active carbon-carbon unsaturated double bond into an oligomer or a polymer, a method in which an ethylenically unsaturated compound having a glycidyl group or an isocyanate group, acrylic acid chloride, methacrylic acid chloride, or acryl chloride, or a carboxylic acid such as maleic acid is reacted with a mercapto group, an amino group, a hydroxyl group, or a carboxyl group in an oligomer or a polymer, or the like.

It is possible to obtain a photosensitive paste, which is less likely to cause pattern defects in the firing step, by using, as the photosensitive monomer or the photosensitive oligomer, a monomer or oligomer having a urethane bond. In the present invention, rapid shrinkage is less likely to occur in the process of proceeding of sintering of a glass in the later stage of the firing step by using a low melting point glass as the glass. This enables suppression of breakage of the barrier rib in the firing step. In addition, when a compound having a urethane structure is used for the organic component, stress relaxation occurs in the process of decomposition and distillation of the organic component in the early stage of the firing step, thus enabling suppression of breakage of the barrier rib within a wide temperature range.

The photo-polymerization initiator is a compound which generates radicals when irradiated with active ray. Specific examples thereof include benzophenone, methyl o-benzoylbenzoate, 4,4-bis(dimethylamino)benzophenone, 4,4-bis(diethylamino)benzophenone, 4,4-dichlorobenzophenone, 4-benzoyl-4-methyl diphenyl ketone, dibenzyl ketone, fluorenone, 2,2-dimethoxy-2-phenylacetophenone, 2-hydroxy-2-methylpropiophenone, thioxanthone, 2-methylthioxanthone, 2-chlorothioxanthone, 2-isopropylthioxanthone, diethylthioxanthone, benzyl, benzyl methoxyethylacetal, benzoin, benzoin methyl ether, benzoin butyl ether, anthraquinone, 2-t-butylanthraquinone, anthrone, benzanthrone, dibenzosuberone, methylene anthrone, 4-azidobenzalacetophenone, 2,6-bis(p-azidobenzylidene)cyclohexanone, 2,6-bis(p-azidobenzylidene)-4-methylcyclohexanone, 1-phenyl-1,2-butadione-2-(O-methoxycarbonyl)oxime, 1-phenyl-1,2-propanedione-2-(O-ethoxycarbonyl)oxime, 1,3-diphenylpropanetrione-2-(O-ethoxycarbonyl)oxime, 1-phenyl-3-ethoxypropanetrione-2-(O-benzoyl)oxime, Michler ketone, 2-methyl-1-[4-(methylthio)phenyl]-2-morphorino-1-propanone, 2-benzyl-2-dimethylamino-1-(4-morpholinophenyl)butanone-1, naphthalenesulfonyl chloride, quinolinesulfonyl chloride, N-phenylthioacridone, benzothiazole disulfide, triphenylphosphine, benzoin peroxide, eosine, and combinations of a photo-reductive pigment such as methylene blue and reducing agents such as ascorbic acid and triethanolamine. Two or more of these compounds may be used in combination.

The photosensitive paste may contain, as a binder, a copolymer having a carboxyl group. The copolymer having a carboxyl group is obtained, for example, by selecting a carboxyl group-containing monomer such as acrylic acid, methacrylic acid, itaconic acid, crotonic acid, maleic acid, fumaric acid, vinylacetic acid, or an acid anhydride thereof, and the other monomer such as a methacrylic acid ester, an acrylic acid ester, styrene, acrylonitrile, vinyl acetate, or 2-hydroxy acrylate, and copolymerizing the monomer using an initiator such as azobisisobutyronitrile. A copolymer having an acrylic acid ester or a methacrylic acid ester and acrylic acid or methacrylic acid as copolymerization components is preferably used as the copolymer having a carboxyl group because of low thermal decomposition temperature during firing.

The photosensitive paste becomes a paste having excellent solubility in an aqueous alkali solution when containing a copolymer having a carboxyl group. The acid value of the copolymer having a carboxyl group is preferably 50 to 150 mg KOH/g. When the acid value is 150 mg KOH/g or less, the allowable range of development can be widened. When the acid value is 50 mg KOH/g or more, solubility of the unexposed area in a developer does not decrease. Therefore, there is no need to increase the concentration of the developer and peeling of the exposed area is prevented, thus making it possible to obtain a high-definition pattern can be obtained. Further, it is also preferable that the copolymer having a carboxyl group has an ethylenically unsaturated group on a side chain. Examples of the ethylenically unsaturated group include an acrylic group, a methacrylic group, a vinyl group, an allyl group, and the like.

The photosensitive paste is prepared by optionally adding an organic solvent and a binder to a low melting point glass and a photosensitive organic component containing a photosensitive monomer, a photosensitive oligomer, a photosensitive polymer, or a photo-polymerization initiator, and compounding various components so as to achieve a predetermined composition, and uniformly mixing and dispersing the mixture using a three-roll roller or a kneader.

The viscosity of the photosensitive paste can be appropriately adjusted by the addition ratio of an inorganic powder, a thickener, an organic solvent, a polymerization inhibitor, a plasticizer, and a precipitation preventive agent, and is preferably within a range of 2 to 200 Pa·s. For example, when the photosensitive paste is applied to the substrate by a spin coating method, the viscosity is preferably 2 to 5 Pa·s. When the photosensitive paste is applied to the substrate by a screen printing method to achieve a film thickness of 10 to 20 μm in a single application, the viscosity is preferably 50 to 200 Pa·s. When a blade coater method or a die coater method, the viscosity is preferably 10 to 50 Pa·s.

A barrier rib can be formed by applying the thus prepared photosensitive paste onto a substrate, and forming a desired pattern using a photolithography method, followed by firing. An example of manufacturing a barrier rib by the photolithography method using the above-mentioned photosensitive paste will be described below, but the present invention is not limited thereto.

The photosensitive paste is applied onto the whole or part of a surface of a substrate to form a photosensitive paste coating film. It is possible to use as a coating method, a screen printing method, or a method using a bar coater, a roll coater, a die coater, or a blade coater. The coating thickness can be adjusted by selecting the number of applications, mesh of the screen, and a viscosity of the paste.

Subsequently, an exposure step is performed. An exposure method is commonly a method in which exposure is performed through a photomask as in usual photolithography. In this case, a photosensitive paste coating film is exposed through a photomask having a predetermined opening corresponding to the objective pattern of a barrier rib. Alternatively, a method of directly drawing by laser light without using a photomask may be used. It is possible to use, as an exposure device, a proximity exposure machine, or the like. When exposure of a large area is performed, a large area can be exposed using an exposure machine having a small exposure area by performing exposure while transferring after applying the photosensitive paste onto the substrate. Examples of the active ray for use in exposure include near infrared ray, visible ray, and ultraviolet ray. It is possible to use, as a light source thereof, for example, a low-pressure mercury lamp, a high-pressure mercury lamp, an ultra-high pressure mercury lamp, a halogen lamp, or a germicidal lamp, and an ultra-high pressure mercury lamp is preferable. Exposure conditions vary depending on the thickness of the photosensitive paste coating film, and is usually performed for 0.01 to 30 minutes using an ultra-high pressure mercury lamp with a power of 1 to 100 mW/cm$^2$.

After exposure, development is performed by making use of a difference in solubility in a developer between the exposed area and the unexposed area of the photosensitive paste coating film to obtain a desired grid-like or stripe-like photosensitive paste coating film pattern. Development is performed using a dipping method, a spray method, or a brush method. It is possible to use a solvent into which an organic component in a paste is soluble, for the developer. Preferably, the developer contains water as a main component. When a compound having an acidic group such as a carboxyl group exists in the paste, development can be performed with an aqueous alkali solution. It is possible to use, as the aqueous alkali solution, an aqueous inorganic alkali solution such as that of sodium hydroxide, sodium carbonate or calcium hydroxide can be used, but use of an aqueous organic alkali solution is more preferable because an alkali component is easily removed during firing. Examples of the organic alkali include tetramethylammonium hydroxide, trimethylbenzylammonium hydroxide, monoethanolamine, diethanolamine, and the like. The concentration of the aqueous alkali solution is preferably 0.05 to 5% by mass, and more preferably 0.1 to 1% by mass. If the alkali concentration is excessively low, a soluble part may not be removed, and if the alkali concentration is excessively high, a pattern part may be peeled and a non-soluble part may be corroded. The development temperature during development is preferably 20 to 50° C. in view of process control.

Next, a firing step is performed in a firing furnace. The atmosphere and temperature for the firing step vary depending on types of the photosensitive paste and the substrate, but firing is performed in air or in an atmosphere of nitrogen, hydrogen, or the like. It is possible to use, as the firing furnace, a batch-type firing furnace or a belt-type continuous firing furnace. Preferably, firing is performed by normally retaining at a temperature of 500 to 700° C. for 10 to 60 minutes. The firing temperature is more preferably 500 to 650° C. By the step mentioned above, the organic component is removed from the photosensitive paste coating film pattern, and the low melting point glass contained in the coating film pattern is softened and sintered to obtain a barrier rib member in which a grid-like barrier rib substantially composed of an inorganic substance is formed onto a substrate.

Next, a reflecting layer is formed. The method for forming a reflecting layer is not particularly limited, and it is possible to make use of various film formation methods such as a method in which a paste containing a reflecting layer is applied and then a solvent is removed by firing, a method in which the paste is sprayed by a spray, and a plating method. Of these, a vacuum film formation method is preferable since a uniform reflecting layer can be formed at comparatively low temperature. Examples of the vacuum film formation method include vacuum deposition, sputtering, ion plating, CVD, and laser ablation, and sputtering is more preferable since a uniform film can be formed on the side surface of the barrier rib. If a temperature higher than the firing temperature of the barrier rib is applied during formation of the reflecting layer, the barrier rib is deformed, and therefore the temperature during formation of the reflecting layer is preferably lower than the temperature during formation of the barrier rib.

The material of the reflecting layer is not particularly limited and it is preferred to use a material capable of reflecting visible light which is an electromagnetic wave having a wavelength 300 to 800 nm emitted by a phosphor. Of these, metal such as silver, god, aluminum, nickel, or titanium, or metal oxide, which is less likely to deteriorate, is preferable.

Because of efficiently making use of emitted light, a reflectance of light having a wavelength of 550 nm of the reflecting layer is preferably 60% or more, and more preferably 80% or more. The reflectance can be measured by an SCI mode of a spectrophotometer. It is possible to measure the reflecting layer formed on a barrier rib as it is. In order to measure more accurately, it is also preferred that a reflecting layer is formed on a glass substrate or a barrier rib solid film on the same conditions as in the case of forming on a reflecting layer, and then measuring, followed by measurement of the reflectance.

In an embodiment of the present invention, a reflecting layer is formed on only one side of the barrier rib. Examples of the method for forming only one the barrier rib include a method in which a film is formed in a state where a substrate is inclined at an angle of 45 degree of more relative to a sputtering target of metal when using a sputtering method, and a method in which after masking a side on which a reflecting layer is not formed, a reflecting layer is formed and then a masking material is removed.

Figure 4:
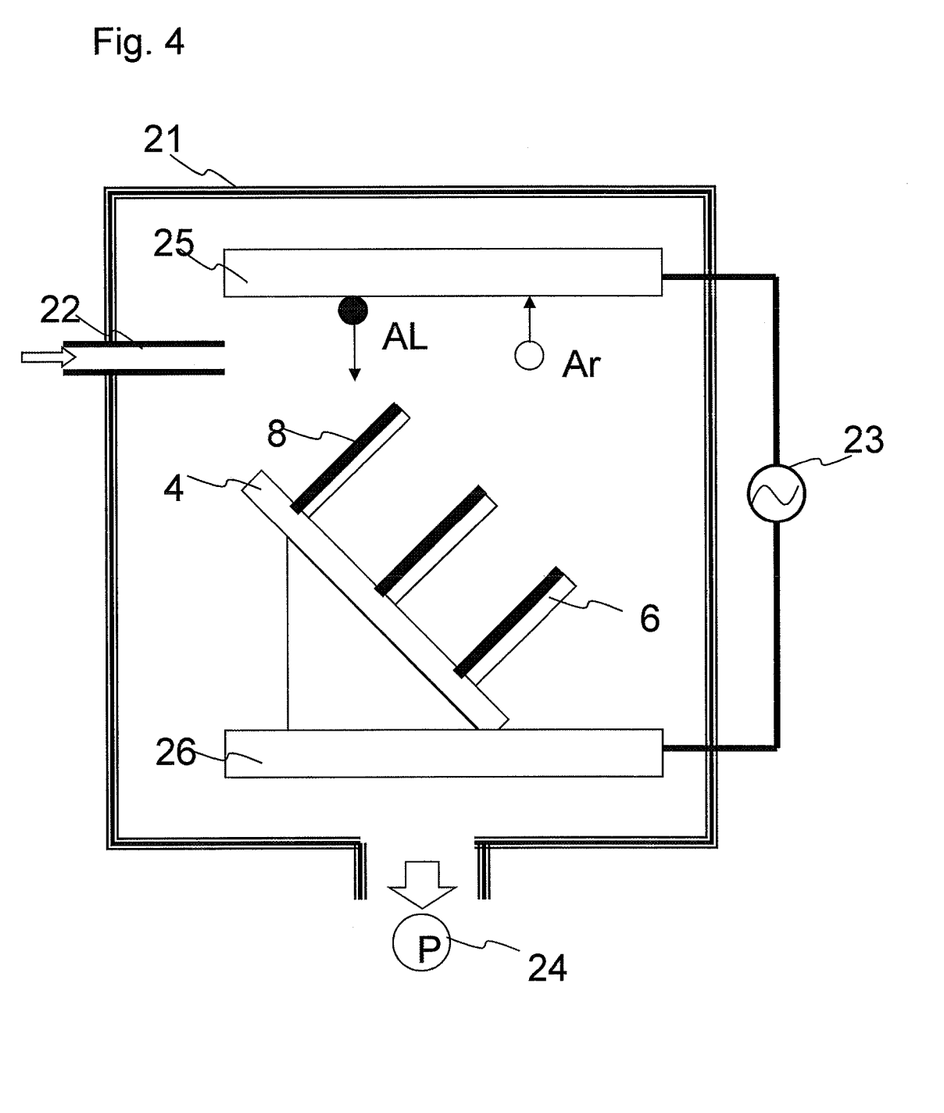
FIG. 4 is a schematic view showing a method for forming a reflecting layer on only one side of the barrier rib using a sputtering method.

FIG. 4 shows an example of a method in which a film is formed in a state where a substrate is inclined at an angle of 45 degree of more relative to a sputtering target of metal. As shown in FIG. 4, when a substrate 4 including barrier ribs 6 formed thereon is sputtered in a state of being inclined at an angle of 45 degree to a sputtering target 25, a reflecting layer 8 is formed on only one side of the barrier ribs 6. Since the opposite side of the barrier rib 6 is shielded with the barrier rib 6, metal atoms coming from the sputtering target are not accumulated.

When the reflecting layer is formed only in specific cells, a reflecting layer can be formed on only one side of the barrier rib. Examples of the method of forming a reflecting layer only in specific cells include a method in which a paste for reflecting layer, containing a reflecting layer powder, an organic binder, and an organic solvent as main components is applied in the objective cells, dried and then optionally fired. Here, examples of the method in which a paste for reflecting layer is applied in cells include a screen printing method in which pattern printing is performed using a screen printing plate, a dispenser method in which a paste for reflecting layer is pattern-applied from tip of a discharge nozzle, or an ink-jet method. It is also possible to use a photosensitive paste method in which a paste for photosensitive reflecting layer, containing a photosensitive organic component is applied on the entire surface, and then a paste for photosensitive reflecting layer of an unnecessary part is removed by exposure and development. When a barrier rib has a stripe-like shape, a dispenser method is preferable and, when the barrier rib has a grid-like shape, a screen printing method, an ink-jet method, or a photosensitive paste method is preferable.

In order to prevent light from leaking from a barrier rib, a light shielding layer is preferably formed between a barrier rib and a reflecting layer. It is more preferred that a light shielding layer is formed on a surface of a reflecting layer and also a reflecting layer is formed on a surface of the light shielding layer. The material of the light shielding layer is not particularly limited, and a metal layer of chromium, nichrome, tantalum, or the like, a resin containing a black pigment such as carbon, or the like can be used. The method for forming a light shielding film is not particularly limited, and a method including applying a past containing a light shielding material, or various kinds of vacuum film formation methods can be used.

The height L1 of the barrier rib is preferably 100 to 3,000 μm, and more preferably 160 to 500 μm. If L1 is more than 3,000 μm, processability in the case of forming the barrier rib deteriorates. Meanwhile, if L1 is less than 100 μm, the amount of fillable phosphor decreases, leading to a decrease in light emission luminance of the scintillator panel thus obtained.

The distance L2 of the adjacent barrier rib corresponding to the pitch of the cell is preferably 30 to 1,000 μm. If L2 is less than 30 μm, processability in the case of forming the barrier rib deteriorates. If L2 is too large, accuracy of images of the scintillator panel thus obtained deteriorates. The height L1 of the barrier rib is preferably more than the distance L2 of the barrier rib. This is because an increase in height of the barrier rib leads to an increase in amount of the phosphor to be filled, thus improving light emission luminance.

Regarding the barrier rib width, the width (bottom width) L3 at the interface where the barrier rib and the substrate are in contact with each other is preferably more than the width L4 of the top (light detector side) of the barrier rib. It is possible to improve reflection efficiency and extraction efficiency of emitted light of the scintillator layer by taking a pseudo-trapezoidal structure in which the barrier rib width of the light detector side is small. When radiation is incident from the light detector side, utilization efficiency of radiation can be enhanced by increasing the filling amount of the phosphor in the vicinity of the light detector side. Further, when the reflecting layer is formed on the barrier rib surface after forming the barrier rib, if L4 is more than L3, the barrier rib side in the vicinity of the top of the barrier rib is shielded by the top of the barrier rib, thus failing to form a reflecting layer.

The bottom width L3 is preferably 10 to 150 μm, and the top width L4 is preferably 5 to 80 μm. If L3 is less than 10 μm, defects of the barrier rib are likely to occur during firing. Meanwhile, if L3 is more than 150 μm, the amount of the phosphor capable of being filed in the space divided by the barrier rib decreases. If L4 is less than 5 μm, the strength of the barrier rib decreases. Meanwhile, if L4 is more than 80 μm, the range capable of extracting emitted light of the scintillator layer is narrowed. In order to enhance sharpness of the radiation detection device, a barrier rib is preferably located between the light detection pigment of the photoelectric conversion layer, and L4 is more preferably made shorter than the distance between adjacent light detection pixels.

An aspect ratio of L1 to L3 (L1/L3) is 1.0 to 25.0. A barrier rib having a larger aspect ratio (L1/L3) can be filled with a larger amount of the phosphor because of its wide space per pixel divided by the barrier rib.

An aspect ratio of L1 to L2 (L1/L2) is 1.0 to 3.5. A barrier rib having a larger aspect ratio (L1/L2) becomes one pixel divided with high definition, and also the space per pixel can be filled with a larger amount of the phosphor.

The height L1 of the barrier rib and the distance L2 of the barrier rib can be measured by exposing a barrier rib cross-section perpendicular to the substrate, and observing the cross-section by a scanning electron microscope ("S4600", manufactured by Hitachi, Ltd.). The width of the barrier rib at a contact part between the barrier rib and the substrate is defined as L3. When a radiation shielding layer exists between the barrier rib and the substrate, the width of the barrier rib at a contact part between the barrier rib and the shielding layer is defined as L3. The width of the topmost of the barrier rib is defined as L4. When it is difficult to accurately grasp the top of the barrier rib or the bottom of the barrier rib since the top of the barrier rib is rounded or the topmost of the barrier rib undergoes hemming, 90% height width (L90) may be measured in place of L4 and 10% height width (L10) may be measured in place of L3. L90 refers to a line width of the part of the height of 90 from the bottom surface of the barrier rib when L1 is 100. Similarly, L10 refers to a line width of the part of the height of 10 from the bottom surface of the barrier rib when L1 is 100.

A scintillator panel can be completed by filling cells divided by the barrier rib with a phosphor. Here, the cell refers to a space divided by a grid-like or stripe-like barrier rib. The phosphor filled in the cell is referred to as a scintillator layer.

It is possible to use, as the phosphor, various known radiation phosphor materials. Particularly, a material having a high conversion rate of radiation to visible light, such as CsI, $Gd_2O_2S$, $Lu_2O_2S$, $Y_2O_2S$, $LaCl_3$, $LaBr_3$, $LaI_3$, $CeBr_3$, $CeI_3$, $LuSiO_5$, or Ba (Br, F, Zn), but the phosphor is not limited thereto. In order to enhance luminous efficiency, various activators may be added. For example, in the case of CsI, a mixture of CsI and sodium iodide (NaI) in an arbitrary molar ratio, or CsI containing activation substances such as indium (In), thallium (Tl), lithium (Li), potassium (K), rubidium (Rb) or sodium (Na) is preferable. Further, a thallium compound such as thallium bromide (TlBr), thallium chloride (TlCl), or thallium fluoride (TlF, $TlF_3$) can also be used as an activator.

In order to form a scintillator layer, it is possible to use a method in which crystalline CsI is deposited by vacuum deposition (in this case, it is also possible to co-deposit a thallium compound such as thallium bromide) and a method in which a slurry of a phosphor dispersed in water is applied to a substrate. However, it is preferred to use a method in which a phosphor paste prepared by mixing a phosphor powder, an organic binder such as ethyl cellulose or an acrylic resin, and an organic solvent such as terpineol or γ-butyrolactone is applied using screen printing or a dispenser method.

The amount of the phosphor filled in cells divided by the barrier rib is preferably 50% to 100% in terms of a volume fraction of the phosphor. If the phosphor filling ratio is less than 50%, efficiency of converting incident radiation into visible light decreases. In order to enhance conversion efficiency of incident radiation, it is also possible to enhance efficiency of conversion into visible light by increasing the aspect ratio of L1 to L2 (L1/L2) of the barrier rib height to the barrier rib pitch. However, it is preferred to further enhance conversion efficiency by filling the space of the cell with a phosphor with high density.

An adhesive layer may be formed between a barrier rib and a scintillator layer of a scintillator panel, and a light detector. The adhesive layer can be formed, for example, of a transparent adhesive of a thermally curable or ultraviolet-curable resin. Such a transparent adhesive is more preferably a transparent adhesive of an acrylic resin, an epoxy resin, a polyester resin, a butyral resin, a polyamide resin, or an ethyl cellulose resin. An adhesive layer may be formed of a low boiling point glass. In order to minimally suppress light scattering at an interface and to efficiently guide emitted light of the phosphor to the light detection pixel, thus improving luminance, a difference in average refractive index between the phosphor and the adhesive layer is preferably less than 0.5. Here, an average refractive index refers to a refractive index of a material when the phosphor or adhesive layer is made of a single material. When the phosphor or adhesive layer is made of plural types of materials, the average refractive index refers to a weighted average of each refractive index.

Since emitted light of the phosphor can be efficiently guided to a light detection pixel, it is preferred to satisfy a relation: $\lambda 2 \geq \lambda 1 \geq \lambda 3$, where $\lambda 1$, $\lambda 2$, and $\lambda 3$ respectively denote an average refractive index of the organic resin binder of the scintillator layer, an average refractive index of the light detection pixel, and an average refractive index of the adhesive layer.

EXAMPLES

The present invention will be described in detail below by way of Examples. However, the present invention is not limited thereto.

Raw Materials of Photosensitive Paste for Barrier Rib

Raw materials used for the photosensitive paste of Examples are as follows.

Photosensitive monomer M-1: trimethylolpropane triacrylate

Photosensitive monomer M-2: tetrapropylene glycol dimethacrylate

Photosensitive polymer: product of addition reaction of 0.4 equivalent of glycidyl methacrylate with carboxyl groups of a copolymer of methacrylic acid/methyl methacrylate/styrene in a mass ratio of 40/40/30 (weight average molecular weight: 43,000, acid value: 100)

Photo-polymerization initiator: 2-benzyl-2-dimethylamino-1-(4-morpholinophenyl)butanone-1 ("IC369", manufactured by BASF Corporation)

Polymerization inhibitor: 1,6-hexanediol-bis[(3,5-di-t-butyl-4-hydroxyphenyl)propionate])

Ultraviolet ray absorber solution: 0.3 mass % γ-butyrolactone solution of Sudan IV (manufactured by TOKYO OHKA KOGYO Co., Ltd.)

Organic resin binder: ethyl cellulose (manufactured by Hercules Inc.)

Viscosity modifier: Flownon EC121 (manufactured by KYOEISHA CHEMICAL CO., LTD.)

Solvent: γ-butyrolactone

Low melting point glass powder: 27% by mass of $SiO_2$, 31% by mass of $B_2O_3$, 6% by mass of ZnO, 7% by mass of $Li_2O$, 2% by mass of MgO, 2% by mass of CaO, 2% by mass of BaO, and 23% by mass of $Al_2O_3$, refractive index (ng): 1.56, glass softening temperature: 588° C., thermal expansion coefficient: $70 \times 10^{-7}$, average particle diameter: 2.3 μm Preparation of Photosensitive Paste for Barrier Rib Four (4) parts by mass of a photosensitive monomer M-1, 6 parts by mass of a photosensitive monomer M-2, 24 parts by mass of a photosensitive polymer, 6 parts by mass of a photo-polymerization initiator, 0.2 part by mass of a polymerization inhibitor, and 12.8 parts by mass of an ultraviolet ray absorber solution were dissolved in 38 parts by mass of a solvent under heating at a temperature of 80° C. After cooling the obtained solution, 9 parts by mass of a viscosity modifier was added to prepare an organic solution. The refractive index (ng) of an organic coating film obtained by applying the organic solution to a glass substrate and drying the applied solution was 1.555.

Next, 30 parts by mass of a low melting point glass powder and 10 parts by mass of a high melting point glass powder were added to 60 parts by mass of the above organic solution, and then the mixture was kneaded by a three-roll kneader to prepare a photosensitive paste for barrier rib.

Preparation of Paste for Underlayer

Forty (40) parts by mass of a terpineol solution (containing 10% by mass of ethyl cellulose), 15 parts by mass of dipentaerythrtol hexacrylate, 1 part by mass of azobisisobutyronitrile, 40 parts by mass of a low melting point glass powder (the material which is the same as the photosensitive paste for barrier rib), and 4 parts by mass of a titanium oxide powder were mixed and then kneaded to prepare a thermally curable paste for underlayer.

Preparation of Paste 1 for Reflecting Layer

Twenty (20) parts by mass of an ethyl cellulose powder was mixed with 80 parts by mass of a benzyl alcohol resin, followed by stirring under heating at 80° C. for 4 hours to obtain a 20 mass % binder resin solution.

Next, 20 parts by mass of an aluminum powder (having an average particle diameter of 3.0 μm), 20 parts by mass of a titanium oxide powder (having an average particle diameter of 0.3 μm), 5 parts by mass of a dispersant (manufactured by KYOEISHA CHEMICAL CO., LTD.), and 35 parts by mass of terpineol were dispersed to obtain a slurry solution. The slurry solution was mixed with 20 parts by mass of the binder resin solution, followed by kneading to prepare a paste 1 for reflecting layer.

Preparation of Paste 2 for Photosensitive Reflecting Layer

Seventy (70) parts by mass of a $TiO_2$ powder (having an average particle diameter of 0.5 μm), 2 parts by mass of a glass powder ($Bi_2O_3/SiO_2/Al_2O_3/B_2O_3$=64/29/4/3 (% by mass); having an average particle diameter of 2.2 μm), 8 parts by mass of a copolymer (copolymer of acrylic acid, methyl methacrylate, and styrene), 7 parts by mass of trimethylolropane triacrylate, 3 parts by mass of benzophenone, 7 parts by mass of butylcarbitol acrylate, and 3 parts by mass of benzyl alcohol were mixed and then kneaded to prepare a paste 2 for photosensitive reflecting layer.

Light Detector

On a surface of a glass substrate having a size measuring 500 mm×500 mm×0.5 mm in thickness (AN-100, manufactured by ASAHI GLASS CO., LTD.), a PIN type photodiode made of amorphous silicon having a refractive index of 3.5 and a plurality of light detection pixels made of TFT having a pixel size of 125 μm×125 μm were formed in a matrix form. Next, a wiring part including a bias wiring for applying a bias to the PIN type photodiode, a driving wiring for applying a driving signal to TFT, a signal wiring for outputting a signal charge transferred by TFT, and the like was formed of aluminum to produce a light detector.

Example 1

On a glass substrate having a size measuring 500 mm×500 mm×0.5 mm in thickness (AN-100, manufactured by ASAHI GLASS CO., LTD.), the paste for underlayer was applied in a thickness of 15 μm by a bar coater, dried at 150° C. for 30 minutes, and then thermally cured to forma 12 μm thick underlayer paste film. Next, the photosensitive paste for barrier rib was applied by a die coater so as to obtain a dry thickness of 500 μm, and then dried at 120° C. for 30 minutes to form a photosensitive paste coating film for barrier rib.

Next, the photosensitive paste coating film for barrier rib was exposed at an exposure dose of 700 mJ/cm$^2$ by an ultra-high pressure mercury lamp through a photomask having an opening corresponding to a desired barrier rib pattern (chrome mask having a grid-like opening having a pitch of 125 μm and a line width of 10 μm in longitudinal and transverse directions). The exposed photosensitive paste coating film for barrier rib was developed in an aqueous 0.5% ethanolamine solution to remove the unexposed area, thus forming a grid-like photosensitive paste coating film pattern. Further, the photosensitive paste coating film pattern was fired in air at 585° C. for 15 minutes to produce a substrate with a grid-like barrier rib having a barrier rib distance L2 of 125 μm, a top width L4 of 10 μm, a bottom width L3 of 20 μm, a barrier rib height L1 of 340 μm, and a size measuring 480 mm×480 mm formed on a surface thereof.

Next, a barrier rib solid film for measurement of a transmittance was formed. On a glass substrate having a size measuring 500 mm×500 mm×0.5 mm in thickness (AN-100, manufactured by ASAHI GLASS CO., LTD.), the photosensitive paste for barrier rib was applied by a die coater so as to obtain a dry thickness of 45 μm, followed by drying under the same conditions as in the case of forming the barrier rib pattern. The entire surface of the substrate was exposed to at an exposure dose of 700 mJ/cm$^2$, and then fired at 585° C. for 15 minutes to form a 30 μm thick barrier rib solid film. Using a spectrophotometer ("U-4100", manufactured by Hitachi, Ltd.), a transmittance of light having a wavelength 550 nm of the barrier rib solid film was measured and found to be 40%.

Next, using a batch type sputtering system (SV-9045, manufactured by ULVAC, Inc.), an aluminum film, namely, an aluminum reflecting layer was formed on the side of the barrier rib. At this time, as shown in FIG. 4, a film was formed in a state where a substrate 4 was inclined at an angle of 45 degree to a sputtering target 25, to form an aluminum reflecting layer only on one inside surface of fours inside surfaces that form each cell. On a substrate holder 26 in a vacuum chamber 21, the obtained substrate 4 including a barrier rib 6 formed thereon was disposed in a state of being inclined at a 45 degree to the sputtering target 25 of aluminum. While introducing an argon gas through a gas introduction port 22, the vacuum chamber 21 inside was evaluated by a vacuum pump 24. Using a high frequency power source 23, high voltage was applied between the aluminum target 25 and the substrate holder 26, followed by sputtering to form a reflecting layer 8 made of aluminum on only one side of the barrier rib 6. The thickness of the aluminum reflecting layer in the vicinity of the barrier rib top was controlled to 300 nm.

Further, an aluminum reflecting layer was formed on one inside surface adjacent to the inside surface including the aluminum reflecting layer formed thereon as mentioned above of remaining three inside surfaces in the same manner. In this way, the aluminum reflecting layer was formed only on adjacent two inside surfaces of four inside surfaces that form each cell.

Next, an aluminum reflecting layer solid film for measurement of a reflectance was formed. A glass substrate having a size measuring 500 mm×500 mm×0.5 mm in thickness (AN-100, manufactured by ASAHI GLASS CO., LTD.) was disposed on a substrate holder 26 in a state of being inclined at an angle of 45 degree and then a 300 nm thick aluminum reflecting layer was formed on the entire surface under the above same conditions. Using a spectrophotometer ("CM-2002", manufactured by Konica Minolta, Inc.), a reflectance of light having a wavelength of 550 nm of the obtained aluminum reflecting layer solid film was measured in an SCI mode and found to be 87%.

Next, a gadolinium oxysulfide powder $Gd_2O_2S$ ($Gd_2O_2S$: Tb) having a particle diameter of 6 μm and a refractive index of 2.2, as a phosphor, was mixed with ethyl cellulose having a refractive index of 1.5, and then a space divided by the barrier rib was filled with the mixture to produce a scintillator panel in which a volume fraction of a phosphor in the cell is 90%.

Next, on a scintillator panel, an adhesive coating film made of a 10 μm thick hot melt resin was formed and a light detector was laid on an adhesive coating film while paying attention to prevent the scintillator panel from bending. In that case, the barrier rib provided on the scintillator panel and the pixel of the photoelectric conversion layer provided on the light detector were allowed to face each other, and the barrier rib was allowed to be located between adjacent pixels. In this way, in a state where the scintillator panel and the light detector are laid one upon another via the adhesive coating film, air bubbles in the adhesive coating film were removed by evacuation with heating at 120° C. in a vacuum press, followed by cooling to room temperature. Thereafter, the adhesive coating film was cured to form an adhesive layer, thus producing a radiation detection device. The adhesive layer thus formed had an average refractive index of 1.6.

Next, X-ray at a voltage of 80 kVp was applied from the light detector side of the radiation detection device, and then the amount of light emitted from the scintillator layer was detected and measured by a light detection pixel and the measured value was regarded as luminance. At this time, a 20 mm thick aluminum filter for removal of soft X-ray was disposed between an X-ray source and a radiation detection device. A rectangular modulation transfer function (MTF) chart made of lead was disposed on the back side (face where no light detection pixel is formed) of the light detector. In the same manner, X-ray at a voltage of 80 kVp was applied through an aluminum filter, and then sharpness was calculated by analyzing X-ray image data obtained by detecting with the light detection pixel using a computer. These values were expressed by a relative value on the assumption that the value of a phosphor solid film including no barrier rib (corresponding to the scintillator panel produced in Comparative Example 3) is regarded as 100. As a result, luminance was 98 and sharpness was 198, and the both exhibited satisfactory value.

Example 2

In the same manner as in Example 1, a substrate including a grid-like barrier rib formed thereon was produced. Using a screen printing method, the paste 2 for photosensitive reflecting layer was applied on the entire surface of a barrier rib and then dried at 120° C. for 30 minutes. Next, a mask having an opening corresponding to a desired reflecting layer formation pattern (pitch of 125 μm in longitudinal and transverse directions; an opening of 125 μm square and a light shielding part are alternately disposed) was disposed so that the opening and cells are made coincident, followed by exposure at an exposure dose of 500 mJ/cm$^2$ using an ultrahigh pressure mercury lamp. The exposed photosensitive reflecting layer paste coating film was developed in an aqueous 0.5% ethanolamine solution to remove the unexposed area, thus obtaining grid-like photosensitive reflecting layer paste coating film pattern. Further, firing was performed in air at 500° C. for 15 minutes, leading to an aspect in which a cell A with a reflecting layer formed on the entire inside surface and a cell B with a reflecting layer not formed on the entire inside surface are alternately, as shown in FIG. 2. A reflectance of light having a wavelength of 550 nm of the reflecting layer was 85%.

In the same manner as in Example 1, a scintillator panel was produced by filling with a phosphor and also a radiation detection device was produced. This radiation detection device was evaluated in the same manner as in Example 1. As a result, luminance was 92 and sharpness was 219, and the both exhibited satisfactory value.

Example 3

In the same manner as in Example 1, an underlayer paste layer and a photosensitive paste for barrier rib coating film were formed on a glass substrate.

Next, exposure and development were performed through a photomask including an opening corresponding to a desired barrier rib pattern formed thereon (photomask including a stripe-like opening having a pitch of 125 μm and a line width of 10 μm) under the same conditions as in Example 1 to form a stripe-like photosensitive paste coating film pattern. The photosensitive paste coating film pattern was further fired in air at 595° C. for 15 minutes to produce a substrate including a stripe-like barrier rib having a barrier rib distance L2 of 125 μm, a top width L4 of 15 μm, a bottom width L3 of 30 μm, a barrier rib height L1 of 330 μm, and a size measuring 480 mm×480 mm formed on a surface. A transmittance of light having a wavelength 550 nm of a barrier rib at a thickness of 30 μm was 70%. Since the barrier rib was fired at a temperature higher than that in Example 1, crystallization of glass constituting the thus obtained barrier rib proceeded and porosity inside decreases, leading to a transmittance higher than that in Example 1.

In the same manner as in Example 1, an aluminum reflecting layer was formed on only one side of a barrier rib, followed by filling with a phosphor in the same manner as in Example 1, a scintillator panel was produced and also a radiation detection device was produced. In the same manner as in Example 1, the radiation detection device was evaluated. As a result, luminance was 98 and sharpness was 151, and the both exhibited satisfactory value.

Example 4

In the same manner as in Example 1, an underlayer paste layer and a photosensitive paste for barrier rib coating film were formed on a glass substrate.

Next, exposure and development were performed through a photomask including an opening corresponding to a desired barrier rib pattern formed thereon (photomask including a stripe-like opening having a line width of 10 μm in which a light shielding part having a pitch of 110 μm and a light shielding part having a pitch of 140 μm are alternately repeated) under the same conditions as in Example 1 to form a stripe-like photosensitive paste coating film pattern. The photosensitive paste coating film pattern was further fired in air at 595° C. for 15 minutes to produce a substrate including a stripe-like barrier rib having a top width L4 of 15 μm, a bottom width L3 of 30 μm, a barrier rib height L1 of 330 μm, and a size measuring 480 mm×480 mm formed on a surface. The distance L2 of the barrier rib had a structure in which cells having a pitch of 110 μm and cells having a pitch of 140 μm are alternately repeated. A transmittance of light having a wavelength 550 nm of a barrier rib at a thickness of 30 μm was 70%.

Next, the paste 1 for reflecting layer was applied only on an inside surface of cells having a pitch of 140 μm using a dispenser method, and then dried at 160° C. for 20 minutes. Then, while observing an adhesive tape (manufactured by Sumitomo 3M Limited) by a microscope, a paste 1 for reflecting layer adhered to the barrier rib top was removed. A reflectance of light having a wavelength 550 nm of a reflecting layer was 90%.

In the same manner as in Example 1, a scintillator panel was produced by filling with a phosphor, and the scintillator panel and a light detector are lid one upon another to produce a radiation detection device. In the same manner as in Example 1, the radiation detection device was evaluated. As a result, luminance was 95 and sharpness was 156, and the both exhibited satisfactory value.

Comparative Example 1

In the same manner as in Example 1, a substrate including a grid-like barrier rib formed thereof was produced. Using a sputtering instrument, an aluminum film was formed on the entire surface of a barrier rib while rotating a substrate. The thickness of the aluminum reflecting layer in the vicinity of the barrier rib top was controlled to 300 nm.

In the same manner as in Example 1, a scintillator panel was produced by filling with a phosphor and also a radiation detection device was produced. In the same manner as in Example 1, the radiation detection device was evaluated. As a result, luminance was 47 and sharpness was 156, and luminance greatly decreased.

Comparative Example 2

In the same manner as in Example 4, a substrate including a stripe-like barrier rib formed thereof was produced.

Next, a paste 1 for reflecting layer was applied on the entire surface of a barrier rib by a screen printing method and then dried at 160° C. for 20 minutes.

In the same manner as in Example 1, a scintillator panel was produced by filling with a phosphor and also a radiation detection device was produced. In the same manner as in Example 1, the radiation detection device was evaluated. As a result, luminance was 46 and sharpness was 150, and luminance greatly decreased.

Comparative Example 3

In the same manner as in Example 1, except that no barrier rib was formed on a scintillator panel and a phosphor solid film was formed, a radiation detection device was produced. In the same manner as in Example 1, the radiation detection device was evaluated.

The above evaluation results reveal that the radiation detection device utilizing the scintillator panel of the present invention exhibits high light emission luminance, thus enabling realization of high-definition images.

REFERENCE SIGNS LIST

1 Radiation detection device
2 Scintillator panel

3 Light detector
4 Scintillator panel side substrate
5 Radiation shielding layer
6 Barrier rib
7 Phosphor (scintillator layer)
8 Reflecting layer
9 Photoelectric conversion layer
10 Light detector side substrate
11 Adhesive layer
21 Vacuum chamber
22 Gas introduction port
23 High frequency power source
24 Vacuum pump
25 Aluminum target
26 Substrate holder
A Cell A
B Cell B
C Cell C
D Cell D The present invention can be usefully used as a scintillator panel which is used in a radiation detection device used for a medical diagnostic apparatus, a nondestructive inspection instrument, and the like.

The invention claimed is:

1. A scintillator panel comprising a sheet-like substrate, a barrier rib provided on the substrate, and a scintillator layer made of a phosphor filled in cells divided by the barrier rib, wherein a reflecting layer is formed on only one side of the barrier rib.

2. The scintillator panel according to claim 1, wherein a transmittance of light having a wavelength of 550 nm at a thickness of 30 μm of the barrier rib is 10 to 100%.

3. The scintillator panel according to claim 1, wherein a reflectance of light having a wavelength of 550 nm of the reflecting layer is 60% or more.

4. The scintillator panel according to claim 1, wherein the barrier rib is a grid-like barrier rib.

5. The scintillator panel according to claim 4, wherein the cells are distinguished into a cell A with a reflecting layer formed on the entire inside surface and a cell B with a reflecting layer not formed on the entire inside surface.

6. The scintillator panel according to claim 5, wherein a pitch of the cell A is wider than a pitch of the cell B.

7. The scintillator panel according to claim 1, wherein the barrier rib is a stripe-like barrier rib.

8. The scintillator panel according to claim 7, wherein the cells are distinguished into a cell C with a reflecting layer formed on the entire inside surface and a cell D with a reflecting layer not formed on the entire inside surface.

9. The scintillator panel according to claim 8, wherein a pitch or the cell C is wider than a pitch of the cell D.

10. The scintillator panel according to claim 1, wherein the barrier rib is composed of a material containing, as a main component, a low melting point glass containing 2 to 20% by mass of an alkali metal oxide.

* * * * *